US011378005B1

(12) United States Patent
Duong et al.

(10) Patent No.: US 11,378,005 B1
(45) Date of Patent: Jul. 5, 2022

(54) COMPRESSOR DIFFUSER AND DIFFUSER PIPES THEREFOR (71) Applicant: PRATT & WHITNEY CANADA CORP., Longueuil (CA)

(72) Inventors: Hien Duong, Mississauga (CA); Jason Nichols, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/124,574

(22) Filed: Dec. 17, 2020

(51) Int. Cl.
*F02C 3/08* (2006.01)
*F04D 29/68* (2006.01)
*F04D 27/02* (2006.01)
*F04D 29/44* (2006.01)

(52) U.S. Cl.
CPC ............ *F02C 3/08* (2013.01); *F04D 27/0215* (2013.01); *F04D 29/44* (2013.01); *F04D 29/441* (2013.01); *F04D 29/68* (2013.01); *F05D 2240/12* (2013.01)

(58) Field of Classification Search
CPC ........ F02C 3/08; F04D 27/0215; F04D 29/44; F04D 29/441; F04D 29/68; F05D 2240/12
See application file for complete search history.

(56) References Cited

U.S. PATENT DOCUMENTS

| | | | | |
|---|---|---|---|---|
| 3,333,762 A * | 8/1967 | Vrana | ................... | F04D 29/441 415/207 |
| 3,768,919 A * | 10/1973 | O'Connor | ............. | F04D 29/441 415/116 |
| 3,856,430 A | 12/1974 | Langham | | |
| 4,131,389 A | 12/1978 | Perrone et al. | | |
| 4,368,005 A | 1/1983 | Exley et al. | | |
| 6,589,015 B1 * | 7/2003 | Roberts | ................. | F04D 29/441 415/208.3 |
| 6,699,008 B2 | 3/2004 | Japikse | | |
| 7,326,027 B1 | 2/2008 | Skoch et al. | | |
| 7,553,122 B2 * | 6/2009 | Kirtley | ................. | F04D 29/682 415/1 |
| 7,628,583 B2 * | 12/2009 | Roberts | ................. | F04D 29/444 415/208.3 |

(Continued)

FOREIGN PATENT DOCUMENTS

| | | |
|---|---|---|
| EP | 1507977 | 2/2005 |
| JP | S569696 | 1/1981 |

(Continued)

*Primary Examiner* — Michael Lebentritt
*Assistant Examiner* — Brian Christopher Delrue
(74) *Attorney, Agent, or Firm* — Norton Rose Fulbright Canada LLP (57) ABSTRACT A diffuser for a compressor of a gas turbine engine is disclosed. The diffuser has a plurality of diffuser pipes circumferentially distributed about an axis of the compressor, each of the plurality of diffuser pipes extending from an inlet to an outlet and having a bend section between the inlet and the outlet, a low pressure side and an opposite high pressure side. A recirculation conduit defines a recirculation path from a first flow region to a second flow region in one or more of the plurality of the diffuser pipes, the first flow region having a greater static pressure than that of the second region, the recirculation conduit having a conduit inlet and a conduit outlet, at least the conduit outlet located within the low pressure side of one of the plurality of the diffuser pipes.

20 Claims, 5 Drawing Sheets (56) References Cited

U.S. PATENT DOCUMENTS

| | | |
|---|---|---|
| 8,021,104 B2 | 9/2011 | Gu et al. |
| 8,087,249 B2 | 1/2012 | Ottaviano et al. |
| 8,122,724 B2 | 2/2012 | Slovisky et al. |
| 8,147,178 B2 | 4/2012 | Ottaviano et al. |
| 8,287,232 B2 | 10/2012 | Gu et al. |
| 8,287,233 B2 | 10/2012 | Chen |
| 8,641,373 B2 | 2/2014 | Porodo et al. |
| 9,234,526 B2 | 1/2016 | Zheng et al. |
| 9,726,084 B2 | 8/2017 | Duong et al. |
| 9,803,652 B2 | 10/2017 | Duong et al. |
| 11,098,650 B2 * | 8/2021 | Balike ................. F02C 7/24 |
| 2013/0036760 A1 | 2/2013 | Sun et al. |
| 2015/0226232 A1 * | 8/2015 | Duong ............... F04D 17/10 |
| | | 415/1 |
| 2017/0248155 A1 | 8/2017 | Parker et al. |
| 2020/0049158 A1 * | 2/2020 | Brogelli ........... F04D 29/682 |

FOREIGN PATENT DOCUMENTS

| | | |
|---|---|---|
| WO | 2012060825 | 5/2012 |
| WO | 2012166858 | 12/2012 |
| WO | 2013084525 | 6/2013 |

\* cited by examiner

COMPRESSOR DIFFUSER AND DIFFUSER PIPES THEREFOR

TECHNICAL FIELD

The application relates generally to gas turbine engines and, more particularly, to pipe diffusers.

BACKGROUND OF THE ART

Compressors in gas turbine engines achieve a pressure rise by adding kinetic energy to a flow of fluid. The diffuser of the compressor, and particularly the diffuser pipes may radially receive high velocity flow from the compressor and redirect the flow in a generally axial direction as it is being diffused. The combination in rapid rise in static pressure and curvature of the flow path as the flow negotiates the diffuser pipes bend may cause a low-momentum flow boundary build up within the diffuser pipes. Low-momentum flow within the diffuser pipes may limit pressure gains achieved by the upstream compressor, contribute to compressor stall and surge, and/or tend to increase mixing loss in the flow path within the diffuser pipes.

SUMMARY

In one aspect, there is provided a diffuser for a compressor of a gas turbine engine, the diffuser comprising: a plurality of diffuser pipes circumferentially distributed about an axis of the compressor, each of the plurality of diffuser pipes extending from an inlet to an outlet, a bend section between the inlet and the outlet, a low pressure side and an opposite high pressure side, the low pressure side and the high pressure side extending on opposite sides of a longitudinal plane coinciding with a center line of a given one of the plurality of the diffuser pipes and extending along the center line; and a recirculation conduit defining a recirculation path from a first flow region to a second flow region in one or more of the plurality of the diffuser pipes, the first flow region having a greater static pressure than that of the second region, the recirculation conduit having a conduit inlet and a conduit outlet, at least the conduit outlet located within the low pressure side of one of the plurality of the diffuser pipes.

In another aspect, there is provided a diffuser pipe for a diffuser of a gas turbine engine compressor, the diffuser pipe comprising: a pipe inlet fluidly connected to a pipe outlet; a bend section extending between the pipe inlet and the pipe outlet for redirecting a main gas flow received radially from the compressor upstream of the diffuser towards the pipe outlet; and a recirculation conduit defining a recirculation path from a first flow region to a second flow region in the diffuser pipe, the first flow region having a greater static pressure than that of the second flow region, the recirculation conduit having a conduit inlet and a conduit outlet, at least the conduit outlet located within a low pressure side of the diffuser pipe.

In a further aspect, there is provided a method for energizing a main gas flow through a diffuser of gas turbine engine compressor, the method comprising: extracting part of the main gas flow from a diffuser pipe at a first flow region within the diffuser pipe having a first static pressure; and reinjecting said part of the main gas flow at a second flow region within the diffuser pipe having a second static pressure lower than the first static pressure via a recirculation conduit defining a recirculation path auxiliary to the main gas flow.

DESCRIPTION OF THE DRAWINGS

Reference is now made to the accompanying figures in which.

DETAILED DESCRIPTION

Figure 1:
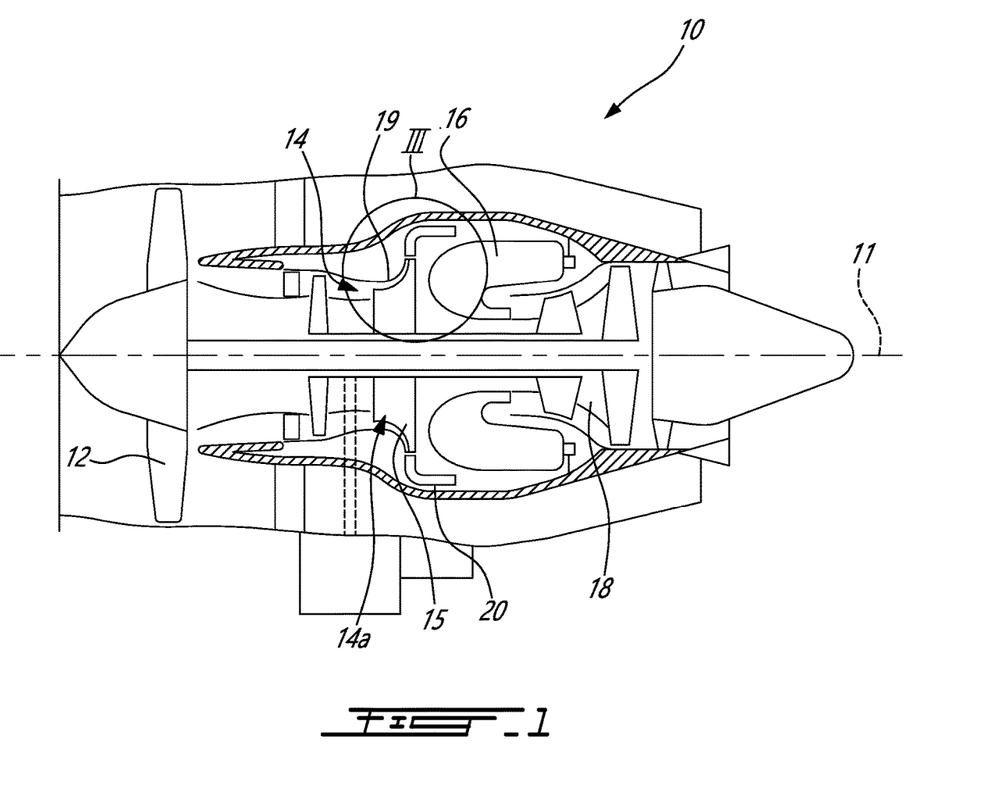
FIG. 1 is a schematic cross-sectional view of a gas turbine engine.

FIG. 1 illustrates an exemplary gas turbine engine 10 of a type preferably provided for use in subsonic flight. The exemplary gas turbine engine 10 as shown is a turbofan, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Also shown is a central longitudinal axis 11 of the engine 10.

Figure 2:
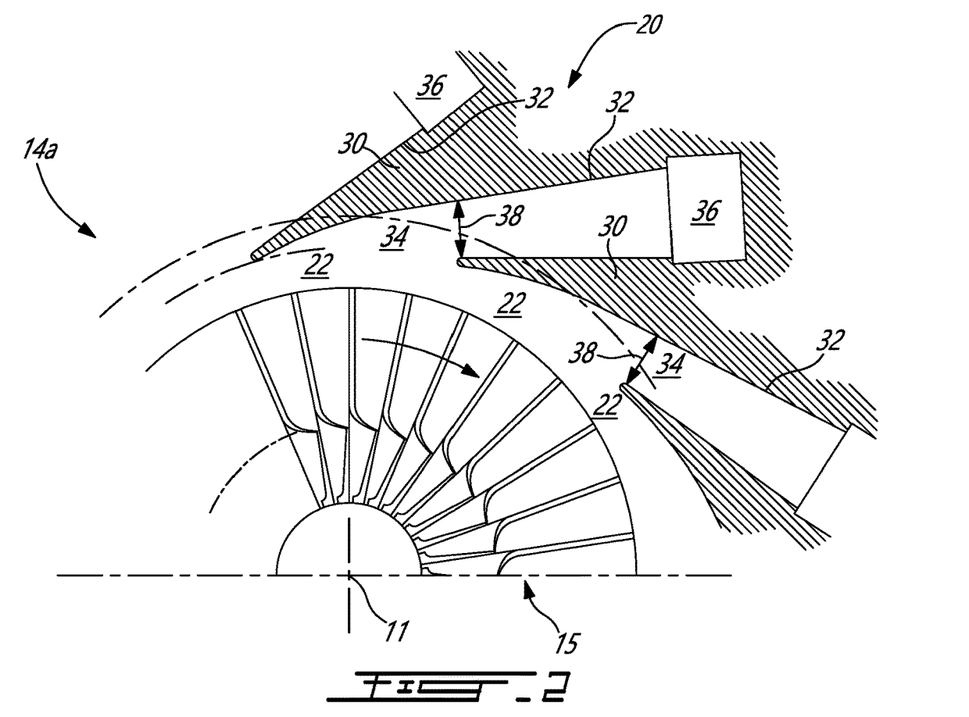
FIG. 2 is a partial transverse cross-sectional view of a portion of a compressor of the gas turbine engine of FIG. 1, viewed along the direction of a longitudinal central axis of the gas turbine engine.
Figure 3:
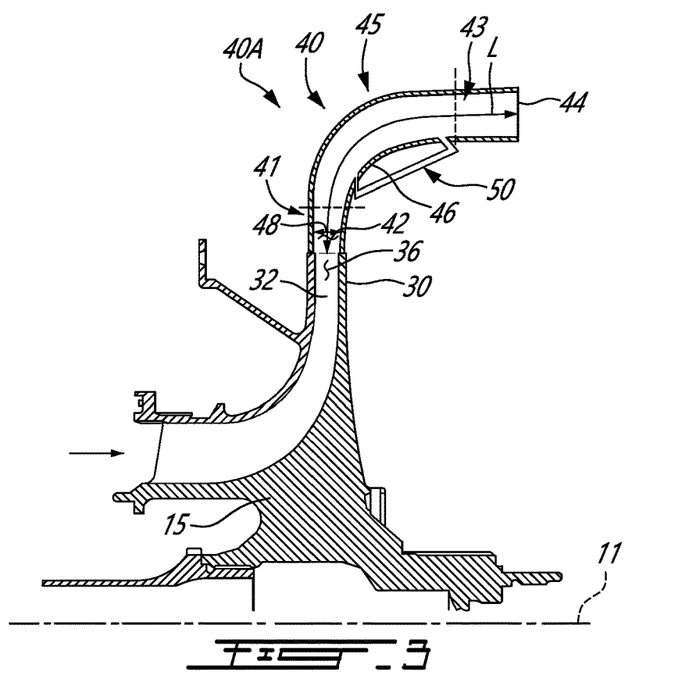
FIG. 3 is an enlarged cross-sectional view of a portion of the centrifugal compressor of FIG. 2, taken from region III in FIG. 1 having a downstream diffuser.

Referring to FIGS. 1 to 3, in the exemplary gas turbine engine 10 shown, the compressor section 14 of the engine 10 includes one or more compressor stages, at least one of which includes a centrifugal compressor 14a. In the depicted embodiment, the centrifugal compressor 14a includes a rotating impeller 15. The impeller 15 draws air axially, and rotation of the impeller 15 increases the velocity of a main gas flow as the main gas flow is directed to flow out in a radially outward direction under centrifugal forces.

A diffuser assembly 20 (or simply "diffuser 20") is positioned immediately downstream of the exit of the impeller 15. The diffuser 20 forms the fluid connection between the impeller 15 and the combustor 16, thereby allowing the impeller 15 to be in serial flow communication with the combustor 16. The diffuser 20 redirects the radial flow of the main gas flow exiting the impeller 15 to an annular axial flow for presentation to the combustor 16. The diffuser 20 also reduces the velocity and increases the static pressure of the main gas flow when it is directed therethrough. In the depicted embodiment, the diffuser 20 includes an annular diffuser body 30 mounted about the impeller 15, a pipe assembly 40A including multiple diffusion members 40 in fluid communication with the diffuser body 30, and one or more recirculation conduits 50 for recirculating part of the compressible fluid (e.g. air) flowing through the diffuser 20 between respective locations, or flow regions, within the diffusion members 40 of the pipe assembly 40A.

Referring to FIG. 2 in more detail, the annular diffuser body 30 forms the corpus of the diffuser 20 and provides the structural support required to resist the loads generated during operation of the compressor 14a. In most embodiments, the diffuser body 30 is a diffuser ring which can have a vaned, vane-less, or semi-vaned space. The diffuser body 30 is mounted about a circumference of the compressor or impeller outlet 22 so as to receive the main gas flow therefrom. The diffuser body 30 has one or more diffuser passages 32. The diffuser passages 32 can be fluid conduits or machined orifices which extend through some, or all, of the diffuser body 30, thus defining fluid paths along which the main gas flow can be conveyed. The diffuser passages 32 each have a passage inlet 34 which is in fluid communication with the impeller outlet 22 so as to receive the main gas flow therefrom, as well as a passage outlet 36 through which the main gas flow exits when it leaves each diffuser passage 32. Each diffuser passage 32 defines a passage throat 38. The passage throat 38 may be located at the passage inlet 34. The precise location of the passage throat 38 within the diffuser passage 32 can be determined using the measured flow characteristics of the main gas flow within the diffuser passage 32, or can correspond to the part of the diffuser passage 32 having the smallest cross-sectional area. From the relatively small cross-sectional area of the passage throat 38, each diffuser passage 32 can expand in cross-sectional area along its length from the passage inlet 34 to the passage outlet 36, thereby helping to diffuse the main gas flow as it is conveyed through the diffuser passages 32. The geometry of the diffuser passages 32 can vary. One possible configuration for the diffuser passages 32 is described in U.S. Pat. No. 9,803,652, the entirety of which is hereby incorporated by reference. Irrespective of the chosen configuration of the diffuser passages 32, it can be appreciated that the annular diffuser body 30 is positioned to surround a periphery of the impeller 15 for capturing the pressurized main gas flow and directing it radially and outwardly through the diffuser passages 32.

Figure 4:
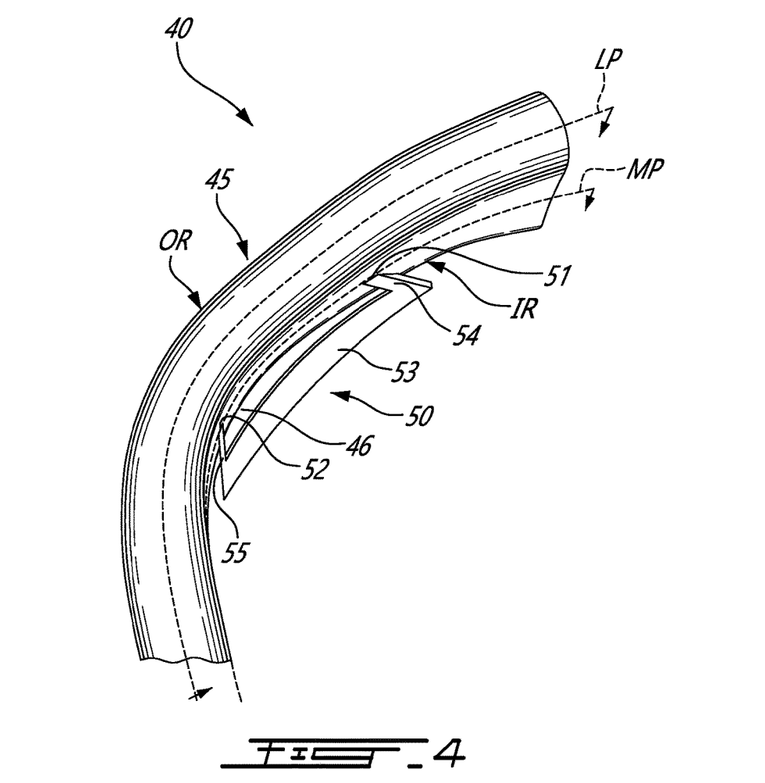
FIG. 4 is an enlarged perspective view of a portion of one diffuser pipe of the diffuser as shown in FIG. 3.

As previously mentioned, the diffuser 20 with the pipe assembly 40A also includes one or more diffusion members 40 disposed downstream from the diffuser body 30. The pipe assembly 40A defines inlet(s) receiving the main gas flow from the compressor 14a, and outlet(s) discharging the main gas flow from the pipe assembly 40A. In the exemplary embodiments shown in the figures, the diffusion members 40 are diffuser pipes, and the terms "diffusion members 40" and "diffuser pipes 40" may thus be used interchangeably here. One possible configuration for a diffuser pipe 40 is shown in FIGS. 3 and 4. Referring to FIG. 3, each of the diffuser pipes 40 is mounted to the diffuser body 30 at a circumferential point thereon corresponding to a diffuser passage 32. Each of the diffuser pipes 40 diffuses the main gas flow, meaning that they slow its velocity and increase its static pressure along their length, and convey it downstream of the compressor 14a. Each diffuser pipe 40 has a member or pipe inlet 42 which is in fluid communication with a corresponding diffuser passage 32, and a member or pipe outlet 44 through which the main gas flow is conveyed out of the diffuser pipe 40 and downstream of the compressor 14a.

The pipe inlet 42 of the diffuser pipe 40 can be bolted onto the diffuser body 30 using a ferrule or other mechanical fastener, or can be alternatively brazed onto the diffuser body 30. Such a diffuser pipe 40 defines an internal passage having a cross-sectional area expanding from the pipe inlet 42 towards the pipe outlet 44, and is generally referred to as a "fishtail" pipe. The diffuser pipes 40 direct the main gas flow from the upstream diffuser body 30 through the expanding cross-section, thereby discharging the main gas flow to the combustor 16 at a low velocity and high pressure.

Each diffuser pipe 40 defines three sections along its length L. The length L is defined herein as a distance from the pipe inlet 42 to the pipe outlet 44 taken along the center line of the diffuser pipe 40. A first section 41 extends along a portion of the length L of the diffuser pipe 40 which begins at the pipe inlet 42 and extends away therefrom. The first section 41 can extend at an orientation that is both tangential and radial to the flow of the main gas flow as it exits the impeller 15. A second section 43 extends in an axial direction and thus substantially parallel to the central axis 11 along a second portion of the length L (or simply "second section length"). The second section 43 ends at the pipe outlet 44, and helps to convey the main gas flow downstream of the compressor 14a, such as to the combustor 16. A third, intermediate, bend section 45 links the first and second sections 41,43 and is in fluid communication with both of these. The bend section 45 begins at the end of the first section 41 and ends at the beginning of the second section 43. The bend section 45 curves or redirects the main gas flow from a substantially radial orientation in the first section 41 to a substantially axial orientation in the second section 43. The bend section 45 includes an apex 46 of the diffuser pipe 40.

At least in some embodiments, such as shown in FIG. 3, each diffuser pipe 40 defines and contains therein an aerodynamic throat 48 located between the pipe inlet 42 and the pipe outlet 44. The location of the aerodynamic throat 48 of the pipe (or simply "pipe throat 48") along the length of the diffuser pipe 40 can vary depending on numerous factors such as the flow conditions of the main gas flow in the diffuser pipe 40, the geometry of the diffuser pipe 40, and the flow conditions upstream and/or downstream of the diffuser pipe 40. For most applications, the location of the pipe throat 48 within the diffuser pipe 40 can be suitably approximated for a given range of operating conditions of the compressor 14a using fluid dynamic analysis. Alternatively, the location of the pipe throat 48 can be approximated to correspond to the location of the smallest cross-sectional area of the diffuser pipe 40 in which it is located, which is within the first section 41 in most embodiments.

The diffuser pipe 40 has an inner radius wall portion IR and an outer radius wall portion OR along at least part of the length of the diffuser piper 40, as can be seen in FIG. 4. In operation, due to an increase in radius of the diffuser pipe 40 after the pipe throat 48, rapid diffusion of the flow occurs as it enters the bend section 45. Such rapid diffusion may cause large boundary layer build up. It is known that the main gas flow in the diffuser pipes 40 can experience an adverse pressure gradient in the direction of flow. This pressure gradient coupled with existing friction forces in the along the wall portions IR, OR of the diffuser pipes 40 can strengthen the effect of deceleration experienced by the main gas flow, which may result in a boundary layer being built up within the diffuser pipe along such wall portions IR, OR. As the flow negotiates the bend section 45 along the inner radius wall portion IR, passing along the apex 46 of the bend section 45, low-momentum flow in the boundary layer along the inner radius wall portion IR may tend to separate therefrom, thereby resulting in mixing loss and/or undesirable flow whine up.

By extracting, at least partially, the low momentum flow into the diffuser pipes and recirculating it at a suitable location, it may be possible to prevent and/or reduce increased blockage and flow separation by energizing the boundary layer along the wall(s) of the diffuser pipes 40. As described herein, a recirculation path between respective locations in one or more of the diffuser pipes 40 may allow flow with momentum deficit at the wall(s) to be replaced with high momentum flow, making the main gas flow more resistant to flow separation.

Referring to FIGS. 3 and 4, and as previously mentioned, the diffuser 20 includes at least one recirculation conduit 50 allowing fluid flow communication from a flow region (or simply "region") having a first static pressure to another region having a second static pressure lower than the first static pressure within the diffuser 20. As such, the compressible fluid can recirculate passively within the diffuser pipes between these regions via the recirculation conduit 50. In other words, the recirculation circuit 50 fluidly interconnects at least two regions, by defining a recirculation path separate from the main gas flow through the diffuser pipe 40. Recirculation via the recirculation conduit 50 is driven by a static pressure differential between a flow extraction point at the first region and a flow reinjection point at the second region. In at least some embodiments, the recirculation of part of the flow reduces mixing losses at least in the second section 43 of the diffuser pipe 40, downstream of the apex 46 of the bend section 45, resulting in an overall performance increase of the pipe diffuser.

Referring to FIG. 4 in more detail, one recirculation conduit 50 will be described in further detail. The recirculation conduit 50 is in fluid flow communication with a single diffuser pipe 40 so as to extract part of the compressible fluid from the diffuser pipe 40 and reinjecting it into the same diffuser pipe 40. The recirculation conduit 50 extends along its length between a conduit inlet 51 which can receive the compressible fluid from the main gas flow within the diffuser pipe 40 and a conduit outlet 52 which can discharge compressible fluid flowing through the recirculation conduit 50 back into the main gas flow of the diffuser pipe 40. In the depicted embodiment, the recirculation conduit 50 extends along an apex side of the diffuser pipe 40, along the inner radius wall portion IR of the diffuser pipe 40. This could be different in other embodiments, as in some examples described later. The inlet 51 and the outlet 52 are in the apex side of the diffuser pipe in this case, though other locations could be contemplated in other embodiments, as in some examples described later.

In the depicted embodiment, the conduit inlet 51 is downstream of the conduit outlet 52 relative to the flow of air through the diffuser pipe 40. As the compressible fluid expand within the diffuser pipe 40 the static pressure increases towards the pipe outlet 44. As such, the conduit inlet 51 is fluidly connected to a region of the main gas flow having a greater static pressure than that of the conduit outlet 52. In at least some embodiments, the inlet 51 may be located at 0.55 L, where L is the pipe length, or between 0.54 L and 0.99 L. In a particular embodiment, the inlet 51 is located at 0.55 L. The outlet 52 may be located between 0.20 L and 0.55 L. In a particular embodiment, the outlet is located at 0.3 L. In at least some embodiments, such locations may allow suitable low-momentum flow extraction from the main gas flow and flow reinjection in a region where flow separation and/or low-momentum may be detected.

Both the conduit inlet 51 and outlet 52 are positioned close to or in the apex side of the diffuser pipe 40. Such apex side may also be referred to as the low pressure side of the pipe 40, the diffuser pipe 40 also having an opposite high pressure side, in that the static pressure of the flow negotiating the bend section 45 generally has a radially outward pressure gradient, whereby the static pressure closer to the inner radius wall portion IR of the diffuser pipe 40 is lower than the static pressure closer to the outer radius wall portion OR of the diffuser pipe 40, at least in the bend section 45, or second section 43 immediately downstream of the bend section 45. The low pressure side and the high pressure side extend on opposite sides of a longitudinal plane LP coinciding with the center line of the diffuser pipe 40 and extending therealong. In other words, the longitudinal plane LP is a curved plane that follows the length L of the pipe 40, such that the longitudinal plane LP cuts the pipe in its center from the pipe inlet 42 to the pipe outlet 44, thereby defining a delimitation between the low pressure side and the high pressure side of the pipe 40 along its length L. As low-momentum flow may occur close to the inner radius wall portion IR, it is desirable to have at least the outlet 52 in the apex side of the diffuser pipe 40 to energize the flow along the inner radius wall portion IR. Location of the inlet 51 also in the apex side in the depicted embodiment may allow extraction of at least part of (or a residual) the low-momentum flow, and/or limit the extent of the recirculation conduit 50, hence its footprint. In an embodiment, the outlet 52 is located upstream of the apex 46 in the bend section 45 of the diffuser pipe. In an embodiment, at least the outlet 52 intersect with a meridional plane MP along the center line of the diffuser pipe 40. The meridional plane MP is transverse to the longitudinal plane LP. The meridional plane MP also cut the pipe 40 in its center, but transversely to the longitudinal plane LP. This can be seen in FIG. 4. In a particular embodiment both the inlet 51 and the outlet 52 intersect with the meridional plane MP.

Figure 5:
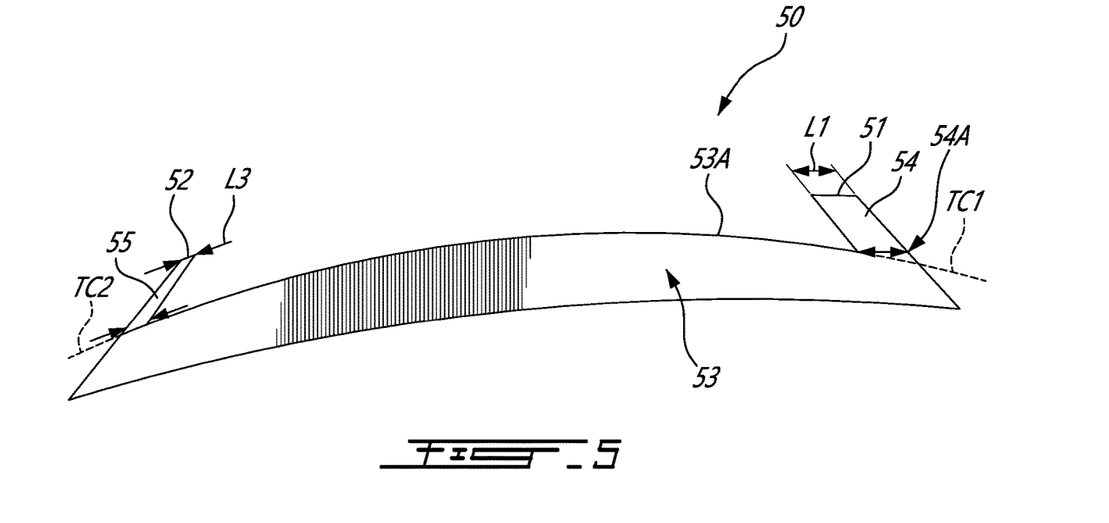
FIG. 5 is a schematic view of an exemplary recirculation conduit of the diffuser pipe shown in FIGS. 3-4.

The exemplary recirculation conduit 50 of FIG. 4 defines a cavity 53 in fluid flow communication with the main gas flow of the diffuser pipe 40 via an extraction channel 54 and a reinjection channel 55 fluidly connected therewith. The cavity 53 forms a volume increase between the extraction channel 54 and the rejection channel 55. Referring to FIG. 5 showing the recirculation conduit 50 of FIG. 4 in isolation, The extraction channel 54 extends from the conduit inlet 51 towards the cavity 53. In the depicted embodiment, the extraction channel 54 defines a diverging passage, which may even further increase the static pressure of the extracted flow as it enters in the recirculation conduit 50, towards the cavity 53. In an embodiment, the extraction channel 54 has a 1:3 cross-sectional area change from the inlet 51 to an end 54A of the channel 54. In the depicted embodiment, the end 54A corresponds to the location delimited by a tangent curve TC1 extending from an upper surface 53A of the cavity 53 and extending across the channel 54, as shown in FIG. 5. Such location may be considered as the junction between the channel 54 and the cavity 53. The reinjection channel 55 extends from the outlet 52 towards the cavity 53. In the depicted embodiment, the reinjection channel 55 defines a converging passage or venturi to funnel the flow back into the main gas flow. This may reduce mixing loss at the reinjection point. In an embodiment, the reinjection channel 55 has a 1:3 cross-sectional area change from the outlet 52 to the junction between the cavity 53 and the channel 55. In the depicted embodiment, such junction is defined by the tangent curve TC2 extending from the upper surface 53A of the cavity 53 and extending across the channel 55, as shown in FIG. 5. Other cross-sectional area changes for the extraction channel 54 and/or reinjection channel 55, could be contemplated (e.g. 1:4), or there can be no divergence or convergence in other embodiments. The volume of the cavity 53 may vary in sizes and/or shape, such as circumferential extent depending on the embodiments. In other embodiments, the recirculation conduit 50 can be a pipe or duct, without cavity, or in the wall(s) of a corresponding diffuser pipe 40, such as capillary tube(s).

Figure 6:
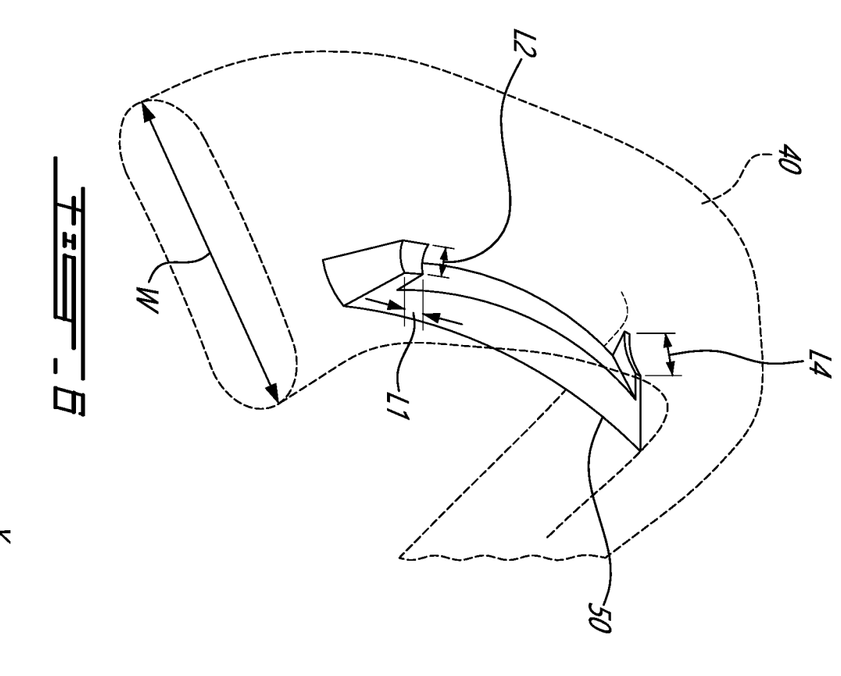
FIG. 6 is another perspective view of a portion of the diffuser pipe of in FIGS. 3-5, shown in dotted line, with the recirculation conduit shown from another viewing angle.

The inlet 51 and/or outlet 52 may have one of a circular, elliptical, rectangular or squared cross-section, or even other cross-sections in some embodiments. With additional reference to FIG. 5, and referring to FIG. 6, the conduit inlet 51 has a longitudinal dimension L1 taken in a direction along the length L of the diffuser pipe 40 and a transverse dimension L2 taken transversely to L1. In an embodiment, a ratio L2/L1 is as follows: 1<L2/L1<3. The conduit outlet 52 has a longitudinal dimension L3 taken in a direction along the length L of the diffuser pipe 40 and a transverse dimension L4 taken transversely to L3. In an embodiment, a ratio L4/L3 is as follows: 1<L4/L3<3. The pipe outlet 44 has a maximum transverse dimension W. In an embodiment, a ratio L1/W is as follows: 0.05<L1/W<0.4.

Figure 7:
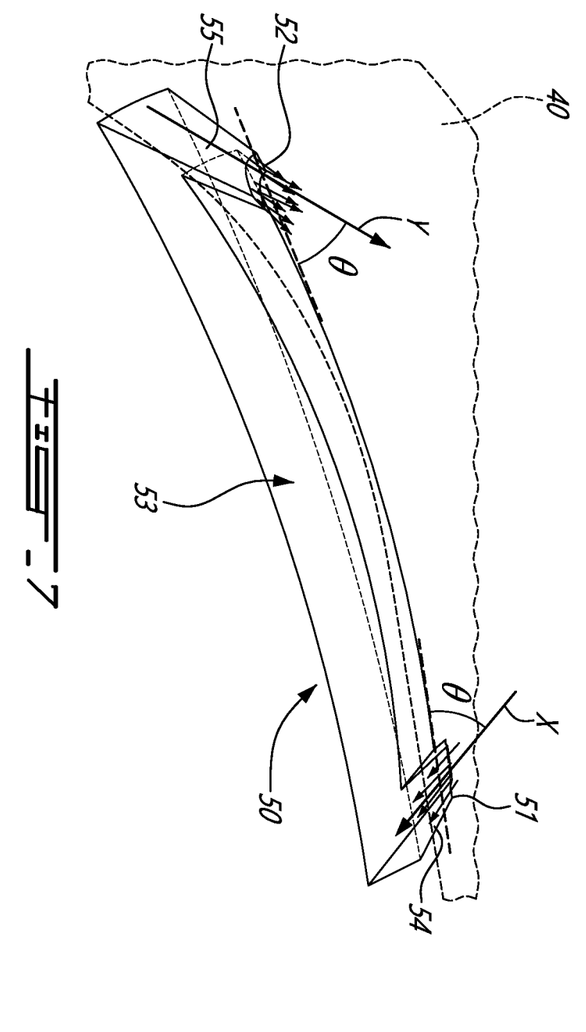
FIG. 7 is a perspective view of the recirculation conduit of FIGS. 3-6, shown from another viewing angle, with a diffuser pipe portion in dotted line.

Referring to FIG. 7, the extraction channel 54 and the reinjection channel 55 are angled relative to a tangent of the pipe wall from which it extends, respectively, in this case the tangent of the inner radius wall portion IR, such as to at least partially aligned the reinjection flow with the direction of the main gas flow within the diffuser pipe 40 or extraction of the flow coming along the main gas flow. The angle Θ may be an acute angle, between 0 and 90 degrees, depending on the embodiment. In some embodiments, the extraction channel 54 and the reinjection channel 55 have an angle Θ between 0 and 30 degrees, and in some cases between 0 and 15 degrees. A smallest angle Θ allows extraction/reinjection as tangent as possible relative to main gas flow within the diffuser pipe 40. This may reduce mixing loss at the reinjection point and/or facilitate extraction of the flow in some embodiments. The angle can be measured with its origin taken at the centroid of the conduit inlet 51 or outlet 52, between the tangent of the pipe wall and a center line vector X,Y extending from such centroids.

Another embodiment of the diffuser pipe(s) 40 discussed above will now be described with reference to FIG. 8, identified at 140, with another exemplary recirculation conduit, identified in FIG. 8 at 150. As mentioned above radially outward pressure gradient may develop in the flow in the bend section 145 of the diffuser pipe 40. Static pressure differential may develop between the inner radius wall portion IR of the diffuser pipe 40 and the outer radius wall portion OR of the diffuser pipe 40. As shown, in at least some embodiments, the recirculation conduit 150 may extend from the high pressure side to the low pressure side of a same diffuser pipe 40. As such, by static pressure differential between the inlet 151 and outlet 152 of the recirculation conduit 150, a recirculation flow may be induced within the recirculation conduit 150. The recirculated flow injected back into the main gas flow within the diffuser pipe 140 within the low pressure side may re-energize the flow in such region, to reduce the radial pressure gradient between such two regions.

Another embodiment of the diffuser 20 with diffuser pipe(s) 40 as discussed above will now be described with reference to FIG. 9, with the pipes 40 identified at 240, with another exemplary recirculation conduit, identified in FIG. 9 at 250. A portion of a diffuser 200 is shown, with a plurality of diffuser pipes 240 extending from a diffuser body 230. As shown, in at least some embodiments, the recirculation conduit 250 may extend from one diffuser pipe 240 to another diffuser pipe 240. In the depicted embodiment, the recirculation conduit 250 interconnects adjacent diffuser pipes 240. The inlet 251 of the recirculation conduit 250 may be defined through a diffuser pipe wall of one diffuser pipe 240 and the outlet 252 may be defined through a diffuser pipe wall of another diffuser pipe 240. In order to obtain passive flow circulation through the recirculation conduit 250, the extraction of the flow from one diffuser pipe 240 is done at a flow region where the static pressure within such diffuser pipe 240 is higher than in the flow region where the flow is injected in the other diffuser pipe 240. In the depicted embodiment, for instance, extraction of part of the flow from one diffuser pipe 240 is within the high pressure side of that diffuser pipe, in the outer radius wall portion OR of the diffuser pipe 240, and reinjection of the extracted flow is upstream of the apex 246 of the bend section 245, within the low pressure side of the diffuser pipe 240. The outlet 252 of the recirculation conduit 250 may be fluidly connected to the main gas flow within the diffuser pipe 240 through an opening in the inner radius wall portion IR of such pipe 240, for instance.

Figure 8:
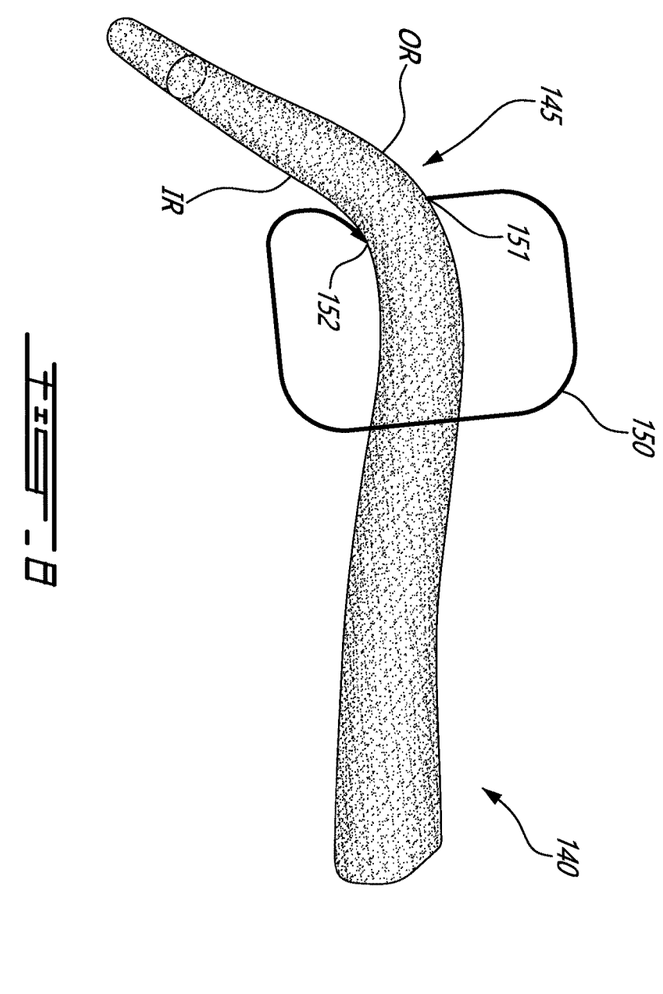
FIG. 8 is another exemplary diffuser pipe with a simplified schematic representation of a recirculation conduit, according to an alternate embodiment.
Figure 9:
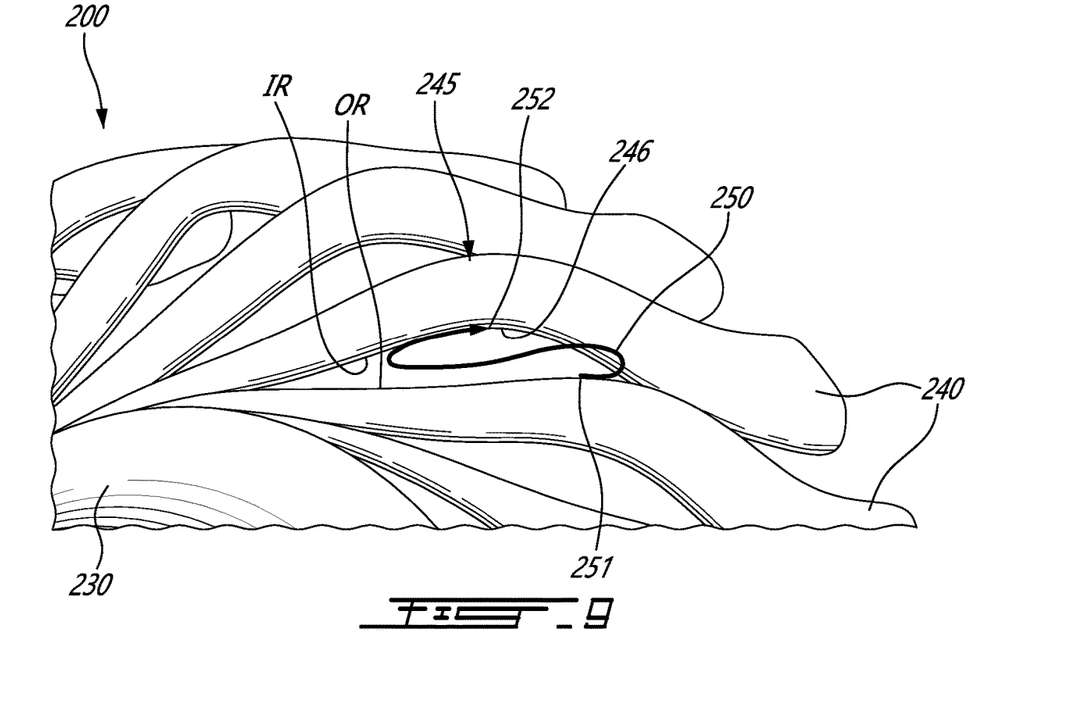
FIG. 9 is a perspective view of a portion of a diffuser as shown in FIGS. 1-3, with diffuser pipes and a simplified schematic representation of a recirculation conduit, according to another alternate embodiment.

It should be understood that the other features of the diffuser pipes and recirculation conduit(s) 50 described herein in connection with various embodiments may also apply to the alternate embodiments of FIGS. 8-9, but not repeated for conciseness.

In use, the diffuser 20 as discussed above receives the main gas flow from the upstream compressor or compressor stages, the compressible fluid that is received enters the diffuser 20 via the diffuser passage(s) 32 and expands as it flows within the diffuser pipes 40. The main gas flow exiting the diffuser pipes 40 at a high static pressure may then be presented to the combustor 16. As the compressible fluid flows through the diffuser pipes 40, part of the main gas flow is extracted from at least one of the diffuser pipes 40 and reinjected in one of the diffuser pipes 40, which may be either the same diffuser pipe 40 (FIGS. 3-8) or another one of the diffuser pipes 40 (FIG. 9). Such extraction and reinjection is practiced using at least one recirculation conduit 50 extending from at least one conduit inlet 51 to at least one conduit outlet 52, which may coincide with respective openings in a pipe wall, or walls. Recirculation is induced passively by the pressure differential between the extraction point and the reinjection point, as discussed above. As mentioned above, extraction and/or reinjection may include angularly extracting and/or reinjecting the flow as tangent as possible relative to the main gas flow within the pipe(s) 40, funneling the reinjected flow back into the main gas flow, and/or further diffusing/expanding the extracted flow as in enters the recirculation conduit 50. Also, in at least some embodiments, recirculation includes extracting part of the main gas flow from a downstream flow region and reinjecting it at an upstream flow region of the main gas flow within the diffuser piper(s) 40. In some cases, extraction and reinjection may be within the low pressure side of the diffuser pipe(s) 40 as opposed to within the opposite high pressure side. In some embodiments, reinjection is made in the bend section 45, upstream of the apex 46. In some embodiments, extraction includes extracting part of a low-momentum flow of the main gas flow, downstream of the apex 46 of the bend section 45. In other embodiments, extraction may include extracting part of the main gas flow within the high pressure side of the pipe(s) 40, in the bend section 45 or elsewhere within the diffuser pipe(s) 40 to reinject it within the low pressure side of the pipe(s) 40, in the bend section 45, e.g. upstream of the apex 46, or immediately upstream of the bend section 45. A method for energizing a main gas flow through a diffuser of gas turbine engine compressor is generally disclosed. The method comprises extracting part of the main gas flow from a diffuser pipe at a first flow region within the diffuser pipe having a first static pressure; and reinjecting said part of the main gas flow at a second flow region within the diffuser pipe having a second static pressure lower than the first static pressure via a recirculation conduit defining a recirculation path separate from the main gas flow. Other in use aspects may be apparent from the structural features and functional features discussed herein. Although reference numbers of FIGS. 3-7 are used in this paragraph, the present description may apply with respect to the alternate embodiments.

Diffuser pipes (40, 140, 240) having the recirculation conduit(s) (50, 150, 250) allowing passive recirculation between two flow regions within the diffuser 20 as disclosed herein may be retrofitted to existing engines. For instance, one or more diffuser pipes having one or more recirculation conduit(s) as disclosed herein may be installed in an existing compressor section 14.

Although the embodiments of the recirculation conduit(s) discussed above have a single inlet and a single outlet, it may be contemplated to have a recirculation conduit with multiple inlets (or "ports") to remove low-momentum flow near the outlet of the diffuser pipe(s). For instance in an embodiment, a recirculation conduit such as discussed herein may have multiple ports fed to one common cavity, or plenum, with a single (or more) outlet (or "exit") upstream of the inlets. Low-momentum flow may be extracted at multiple selected locations for reinjection at one (or more) locations within the pipe diffuser 20.

The recirculation conduit(s) discussed above in connection with various embodiments may be manufactured using additive manufacturing techniques, such as three dimensional printing, or using other manufacturing techniques, including machining, molding, etc. In at least some embodiments, additive manufacturing techniques may facilitate the manufacturing of the pipes equipped with the recirculation conduit(s), whether they are of the capillary tubes type, or else, as discussed above.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, even though the description and accompanying drawings specifically refer to a turbofan engine as an example, it is understood that aspects of the present disclosure may be equally applicable to other types of aircraft engines in general, and other types of gas turbine engines in particular, including but not limited to turboshaft and turboprop engines, auxiliary power units (APU), and the like. Yet further modifications could be implemented by a person of ordinary skill in the art in view of the present disclosure, which modifications would be within the scope of the present technology.

The invention claimed is:

1. A diffuser for a compressor of a gas turbine engine, the diffuser comprising:
   a plurality of diffuser pipes circumferentially distributed about an axis of the compressor, each of the plurality of diffuser pipes extending from an inlet to an outlet, a bend section between the inlet and the outlet, a low pressure side and an opposite high pressure side, the low pressure side and the high pressure side extending on opposite sides of a longitudinal plane coinciding with a center line of a given one of the plurality of the diffuser pipes and extending along the center line; and
   a recirculation conduit defining a recirculation path from a first flow region to a second flow region in one or more of the plurality of the diffuser pipes, the first flow region having a greater static pressure than that of the second flow region, the recirculation conduit having a conduit inlet and a conduit outlet, at least the conduit outlet located within the low pressure side of one of the plurality of the diffuser pipes, wherein the conduit outlet is in the bend section of one of the plurality of the diffuser pipes.

2. The diffuser as defined in claim 1, wherein both the conduit inlet and the conduit outlet are located within the low pressure side of a same one of the plurality of the diffuser pipes, the conduit inlet downstream of the conduit outlet relative to a main flow of air through the diffuser.

3. The diffuser as defined in claim 1, wherein the conduit outlet intersects with a meridional plane along the center line of one of the plurality of the diffuser pipes.

4. The diffuser as defined in claim 1, wherein the recirculation conduit extends along an inner radius wall portion of said one diffuser pipe.

5. The diffuser as defined in claim 1, wherein the conduit inlet has a longitudinal dimension L1 taken in a direction along a length of the one of the plurality of the diffuser pipes from which the conduit inlet receives part of a main flow of air through the diffuser, and a transverse dimension L2 taken transversely to L1, wherein $1<L2/L1<3$.

6. The diffuser as defined in claim 1, wherein the conduit outlet has a longitudinal dimension L3 taken in a direction along a length L of the one of the plurality of the diffuser pipes to which the conduit outlet discharge flow from the recirculation conduit, and a transverse dimension L4 taken transversely to L3, wherein $1<L4/L3<3$.

7. The diffuser as defined in claim 1, wherein the recirculation conduit defines a cavity in fluid flow communication with a main gas flow within the one or more of the plurality of the diffuser pipes via an extraction channel extending from the conduit inlet and a reinjection channel extending from the conduit outlet.

8. The diffuser as defined in claim 7, wherein the extraction channel defines a diverging passage extending from the conduit inlet.

9. The diffuser as defined in claim 7, wherein the reinjection channel defines a converging passage ending at the conduit outlet.

10. The diffuser as defined in claim 7, wherein at least one of the extraction channel and the reinjection channel has a cross-sectional area change of 1:3, said cross-sectional area change starting at the conduit inlet for the extraction channel and ending at the conduit outlet for the reinjection channel.

11. The diffuser as defined in claim 7, wherein the extraction channel and the reinjection channel are acutely angled relative to a tangent of an inner radius wall portion of the one or more of the plurality of the diffuser pipes in a direction of a main gas flow through the diffuser.

12. The diffuser as defined in claim 1, wherein the conduit inlet is in an outer radius wall portion of one of the plurality of the diffuser pipes, and the conduit outlet is in an inner radius wall portion of said one of the plurality of the diffuser pipes.

13. The diffuser as defined in claim 1, wherein the recirculation conduit interconnects adjacent ones of the plurality of the diffuser pipes, the conduit inlet defined through a diffuser pipe wall of a first one of the plurality of the diffuser pipes, the conduit outlet defined through a diffuser pipe wall of a second one of the plurality of the diffuser pipes.

14. A diffuser pipe for a diffuser of a gas turbine engine compressor, the diffuser pipe comprising:
- a pipe inlet fluidly connected to a pipe outlet;
- a bend section extending between the pipe inlet and the pipe outlet for redirecting a main gas flow received radially from the compressor upstream of the diffuser towards the pipe outlet; and
- a recirculation conduit defining a recirculation path from a first flow region to a second flow region in the diffuser pipe, the first flow region having a greater static pressure than that of the second flow region, the recirculation conduit having a conduit inlet and a conduit outlet, at least the conduit outlet located within a low pressure side of the diffuser pipe, wherein the conduit inlet and the conduit outlet intersect with a meridional plane along a center line of the diffuser pipe.

15. The diffuser pipe as defined in claim 14, wherein the conduit outlet is upstream of an apex of the diffuser pipe.

16. The diffuser pipe as defined in claim 14, wherein the pipe outlet has a maximum transverse dimension W, the conduit inlet has a longitudinal dimension L1 taken in a direction along a length of the diffuser pipe, wherein $0.05 < L1/W < 0.4$.

17. The diffuser pipe as defined in claim 14, wherein the diffuser pipe has a length L from the pipe inlet to the pipe outlet taken along the center line of the diffuser pipe, the conduit inlet located between 0.54 L and 0.99 L.

18. The diffuser pipe as defined in claim 17, wherein the conduit outlet is located between 0.20 L and 0.55 L.

19. A diffuser for a compressor of a gas turbine engine, the diffuser comprising:
- a plurality of diffuser pipes circumferentially distributed about an axis of the compressor, each of the plurality of diffuser pipes extending from an inlet to an outlet, a bend section between the inlet and the outlet, a low pressure side and an opposite high pressure side, the low pressure side and the high pressure side extending on opposite sides of a longitudinal plane coinciding with a center line of a given one of the plurality of the diffuser pipes and extending along the center line; and
- a recirculation conduit defining a recirculation path from a first flow region to a second flow region in one or more of the plurality of the diffuser pipes, the first flow region having a greater static pressure than that of the second flow region, the recirculation conduit having a conduit inlet and a conduit outlet, the conduit inlet and the conduit outlet located within the low pressure side of a same one of the plurality of the diffuser pipes, the conduit inlet downstream of the conduit outlet relative to a main flow of air through the diffuser.

20. A diffuser for a compressor of a gas turbine engine, the diffuser comprising:
- a plurality of diffuser pipes circumferentially distributed about an axis of the compressor, each of the plurality of diffuser pipes extending from an inlet to an outlet, a bend section between the inlet and the outlet, a low pressure side and an opposite high pressure side, the low pressure side and the high pressure side extending on opposite sides of a longitudinal plane coinciding with a center line of a given one of the plurality of the diffuser pipes and extending along the center line; and
- a recirculation conduit defining a recirculation path from a first flow region to a second flow region in one or more of the plurality of the diffuser pipes, the first flow region having a greater static pressure than that of the second flow region, the recirculation conduit having a conduit inlet and a conduit outlet, at least the conduit outlet located within the low pressure side of one of the plurality of the diffuser pipes, wherein the conduit inlet has a longitudinal dimension L1 taken in a direction along a length of the one of the plurality of the diffuser pipes from which the conduit inlet receives part of a main flow of air through the diffuser, and a transverse dimension L2 taken transversely to L1, wherein $1 < L2/L1 < 3$.

\* \* \* \* \*